United States Patent [19]

Grimes

[11] 4,325,614
[45] Apr. 20, 1982

[54] EXPOSURE CONTROL SYSTEM WITH SHUTTER OPERATION CONTROLLED BY A MICROCOMPUTER

[75] Inventor: Donald L. Grimes, Milford, Mass.

[73] Assignee: Polaroid Corporation, Cambridge, Mass.

[21] Appl. No.: 216,831

[22] Filed: Dec. 16, 1980

[51] Int. Cl.³ .............................................. G03B 7/097
[52] U.S. Cl. .................................. 354/23 D; 354/29
[58] Field of Search ..................... 354/23 D, 26, 29, 30

[56] References Cited

U.S. PATENT DOCUMENTS

| | | | |
|---|---|---|---|
| 3,628,119 | 12/1973 | Abraham | 318/685 |
| 3,636,429 | 1/1972 | Jakubowski et al. | 318/685 |
| 3,733,991 | 5/1973 | Kobayashi et al. | 354/29 X |
| 3,820,131 | 6/1974 | Tanaka | 354/38 |
| 3,900,855 | 8/1975 | Stempeck | 354/29 |
| 3,945,025 | 3/1976 | Stempeck | 354/29 |
| 4,053,907 | 10/1977 | Iwata et al. | 354/29 |
| 4,066,347 | 1/1978 | Wagensonner | 354/23 D X |
| 4,196,987 | 4/1980 | Erlichman | 354/23 D |

OTHER PUBLICATIONS

"Microprocessor Exposure Control in a Camera", by D. M. Harvey, *Research Disclosures*, Feb. 1980, #19041.
"Photographic Shutters: Better Pictures ...", by W. T. Plummer, *Applied Optics*, vol. 16, p. 1914, Jul. 1977.

*Primary Examiner*—Michael L. Gellner
*Attorney, Agent, or Firm*—John S. Vale

[57] ABSTRACT

An automatic exposure control system, of the type wherein a dynamic aperture blade mechanism is displaceably driven by a stepper motor, is provided with a microcomputer that is preprogrammed with data representing a plurality of different blade trajectory signal programs for different photographic conditions. In response to inputs, including scene brightness level, provided before or during an exposure cycle, the computer develops an appropriate trajectory signal program and feeds the signals to the stepper motor so as to drive the blade mechanism in a manner characterized by a corresponding trajectory curve that is correlated to the indicated photographic conditions. In one embodiment the system is configured for open loop operation, and, in an alternative embodiment, the system additionally includes a blade position feedback circuit for closed loop operation.

5 Claims, 7 Drawing Figures

EXPOSURE CONTROL SYSTEM WITH SHUTTER OPERATION CONTROLLED BY A MICROCOMPUTER

BACKGROUND OF THE INVENTION

The present invention relates to the field of photography and, more specifically, to automatic exposure control systems for cameras which utilize a dynamic aperture scanning shutter of the type wherein an integrated blade mechanism performs both the effective aperture and exposure interval defining functions.

The integrated blade mechanism may be of the type including a pair of elongated blade members mounted in superposed relation for simultaneous movement, in opposite directions, between a closed position and a maximum aperture defining open position. Generally, the blades have complementary longitudinally tapered aperture defining openings therein arranged with their respective narrower ends in facing relation.

When the blades are in the closed position, their openings are completely out of registration and the blades block transmission of image forming light from a scene to the camera film plane. To initiate exposure, the blades are moved simultaneously in opposite directions causing the openings to progressively overlap and define a light transmission aperture that increases in size as a function of blade displacement from the closed position. Upon reversing the direction of blade drive, the light transmission aperture progressively decreases in size until it closes to terminate the exposure interval.

Other types of scanning shutters employ multiple pivoting blades arranged in an iris diaphragm configuration but basically operate in the same manner as the two-bladed shutter.

The characteristics of a given ambient light exposure made with a scanning shutter can be portrayed graphically by plotting an aperture size (area) versus time trajectory curve. The area bounded by the trajectory is indicative of the total quantity of light that reaches the film to effect exposure. The shape of the trajectory, however, indicates the nature of the exposure in terms of depth of field, motion stopping ability and other exposure parameters.

For example, assuming adequate ambient light conditions for a particular type of film, one trajectory that bounds a given area A may be generally triangular in shape and show that the blades open slowly to a relatively small peak aperture and then close at the same rate. Thus the slope of the opening and closing segments are fairly shallow. In this case the average or effective aperture is small compared to the maximum obtainable aperture and the recorded image will exhibit sharp focus over a relatively deep field.

A second triangular trajectory that bounds the same given area A (thereby providing the same exposure level as the first exposure) may indicate that the blades open quickly to a relatively large peak aperture and then close quickly at the same rate. The slope of the opening and closing segments of the trajectory will be fairly steep but the exposure interval will be shorter than in the first exposure. In this instance, the short exposure interval provides good motion stopping ability. However, because the effective aperture is relatively large, the depth of field of the recorded image will not be as deep as it was in the first exposure.

In addition to dependability and cost effectiveness, a very important characteristic and design goal of any exposure control system incorporating a scanning shutter is versatility.

In terms of photographic performance, versatility can be rated by the system's ability, or lack thereof, to accurately generate a wide variety of different shaped trajectory curves, both automatically and in response to user inputs, to accommodate varying scene conditions, different film speeds and/or exposure characteristics, and also to modify the exposure characteristics for a given set of scene conditions.

Another measure of a system's versatility relates to its potential for wide use and sustained longevity in a climate of rapidly changing technology. That is, can it be economically incorporated into a camera product line that varies in sophistication and price? And, perhaps more importantly, is it capable of being updated periodically with relatively inexpensive modifications to take advantage of newly developing exposure ideas in areas such as optimization of trajectory curves for the best compromise between motion stopping ability and depth of field; or development of trajectory curves that enhance the performance of a particular optical system.

Scanning shutter systems wherein the rate of blade displacement can be varied to generate different trajectories are, of course, known in the prior art. For example, U.S. Pat. Nos. 3,733,991 and 3,820,131 disclose shutters wherein the rate at which the spring driven blades are displaced is controlled by either a mechanical or electromagnetic braking system. In the first patent, the braking action is varied in response to aperture and exposure interval inputs provided when the user manually sets corresponding input rings on the shutter housing. As shown in FIG. 16, it is suggested that the braking action may be varied during the exposure interval to effect blade acceleration and deceleration thereby generating trajectory curves which have non-linear portions. In the second patent, the braking action is set automatically in accordance with the scene brightness levels monitored by a photocell circuit. While these systems provide some performance versatility, their mechanical complexity limits their ability to be used in a number of different camera models and to be easily updated with only minimum modification.

Therefore, it is an object of the present invention to provide an exposure control system for use in photographic apparatus that is highly versatile in both its photographic performance and ability to be economically incorporated into a number of different camera systems as well as being able to be easily updated with minimum modification.

Other objects of the invention will, in part, be obvious and will, in part, appear hereinafter.

The exposure control system of the present invention utilizes an integrated blade mechanism driven by a stepper motor under the control of a microcomputer which is programmed to draw upon stored trajectory data, in response to selected inputs, and develop an appropriate set or program of motor driving trajectory signals to provide a corresponding trajectory curve. Such a system allows the shutter to be programmed for the generation of as many different trajectories as is appropriate for the level of sophistication of the camera in which it is to be used. Also, the system may be updated periodically for use in new products simply by reprogramming.

Certain elements of the exposure control system embodying the present invention are known in the prior art. For example, commonly-assigned U.S. Pat. Nos.

3,900,855 and 3,945,025 show a scanning shutter driven by a stepper motor. In U.S. Pat. No. 4,053,907 an elongated array of light chopping slits are cut through one of the shutter blades so that blade displacement may be optically detected in order to generate pulse signals which control the stepwise rotation of the stepper motor. U.S. Pat. Nos. 3,628,119 and 3,636,429 are relevant for showing closed loop stepper motor control systems. U.S. Pat. No. 4,066,347 is relevant for showing a camera wherein the frequency of stepper motor drive pulses is varied to change the rate at which aperture defining blades are displaced. A disclosure by D. M. Harvey appearing in *Research Disclosure,* February 1980, No. 19041, entitled "Microprocessor Exposure Control In A Camera" is relevant for showing an exposure control system that is operated by a microprocessor and is responsive to automatic and manual inputs for selecting a proper one of a plurality of exposure control programs from a storage unit.

SUMMARY OF THE INVENTION

The present invention provides a highly versatile exposure control system usable in photographic apparatus for controlling transmission of image forming light rays from a scene to a film unit in a film plane. The system comprises a blade mechanism; an arrangement for mounting the blade mechanism; a stepper motor; means for storing preprogrammed trajectory data and electrical circuit means, preferably including a microprocessor.

The blade mechanism is mounted for displacement between a first arrangement where it blocks transmission of scene light to the film plane and a second arrangement where it defines a maximum aperture. The blade mechanism serves to define a range of progressively increasing sized apertures as it moves from its first arrangement toward a second arrangement and then a range of progressively decreasing sized apertures as it returns to the first arrangement for unblocking transmission of scene light to the film plane during an exposure interval.

The stepper motor is responsive to a program of trajectory signals for driving the blade mechanism in a manner whereby its operation is characterized by an aperture size versus time trajectory curve defined by the program of trajectory signals.

Held in the storing means are at least characterizing elements of a plurality of different trajectory signal programs defining corresponding trajectory curves that are appropriate for differing photographic conditions.

The electrical circuit means is responsive to one or more electrical input signals indicative of preexposure photographic conditions or of photographic conditions ascertained during the course of an exposure interval for selecting appropriate characterizing elements from the storage means and therefrom developing and feeding a correlated program of trajectory signals to the stepper motor.

The system is responsive to both automatically provided inputs, such as scene or image brightness level, and manual inputs provided at the election of the operation for selecting either motion stopping or depth-of-field emphasizing trajectory curves.

In a first embodiment, the exposure control system is configured for open loop operation which provides a level of performance that is well suited for use in a wide variety of cameras. For use in more sophisticated cameras wherein additional costs are justified by the provision of more exposure options, the performance level of the system can be extended by configuring it for closed loop operation.

In this second embodiment, the system further includes a feedback subsystem for monitoring actual blade mechanism displacement during the course of an exposure interval and providing an electrical displacement output representative of such actual displacement; and means for comparing the displacement output with the development trajectory program and, when the difference therebetween exceeds a predetermined limit, for providing a correction signal program to the stepper motor to adjust the rate of blade mechanism drive so that the trajectory curve characterizing actual blade displacement conforms more closely to the trajectory curve defined by the developed program of trajectory signals.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
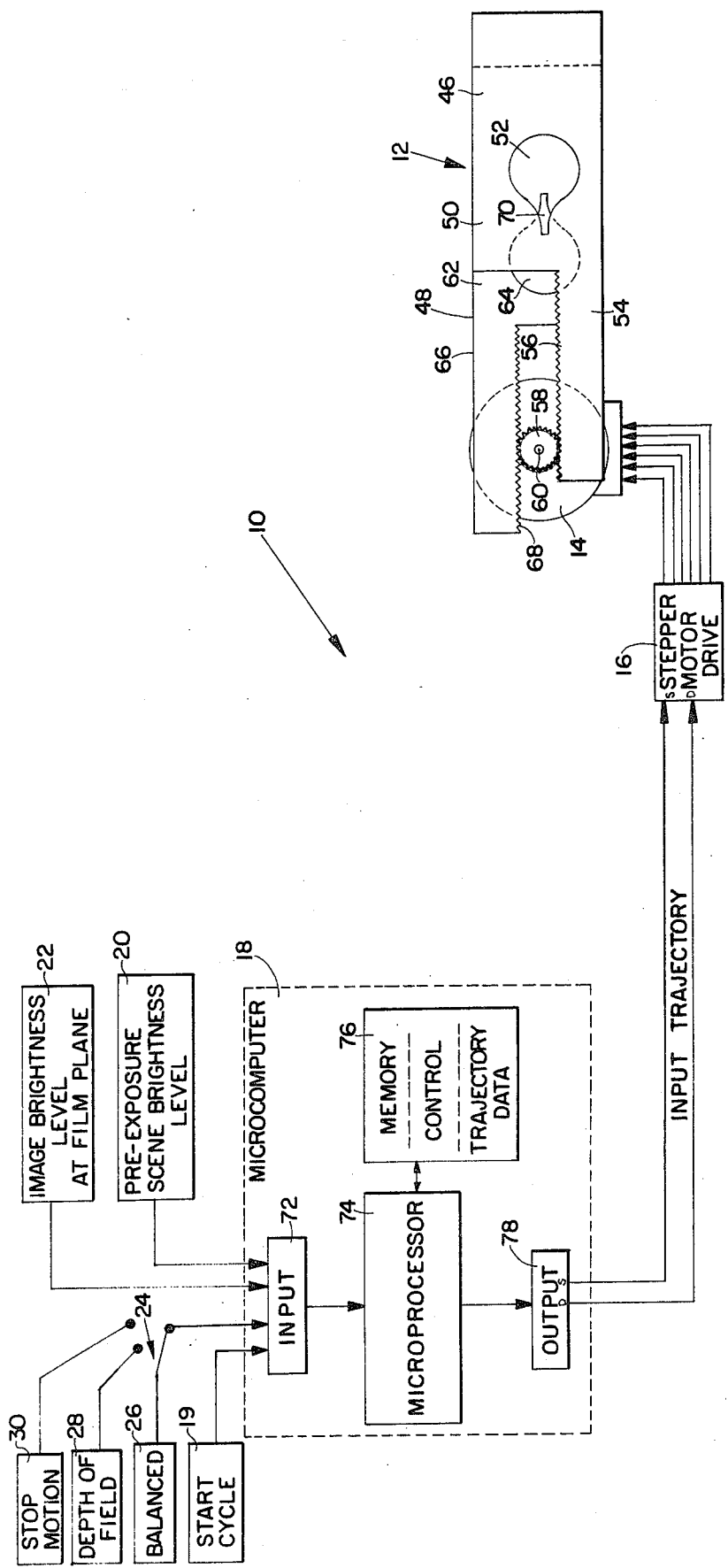
FIG. 1 is a block diagram showing an exposure control system embodying the present invention configured for open loop operation.

A first embodiment of an automatic exposure control system 10 incorporating the present invention is shown in block diagram form in FIG. 1.

System 10 includes a dynamic aperture scanning shutter blade mechanism 12 which is configured to be driven by a reversible stepper motor 14 operated by a stepper motor drive circuit 16 under the control of a microcomputer 18. The operation of microcomputer 18 is, in turn, responsive to a plurality of inputs. These include a cycle start input 19 provided in response to the user manually actuating an exposure cycle start button and automatically provided inputs such as preexposure scene brightness level, designated 20, and image brightness level at the film plane, designated 22, measured during the course of an exposure interval. Additional inputs may be provided manually by the operator. For example, the operator may set a three position switch 24 to select an automatic normal or balanced mode of operation, designated 26, or, alternatively, automatic depth of field or stop motion modes, designated 28 and 30 respectively.

As will become more apparent later, in the balance mode, microcomputer 18 utilizes a trajectory data program appropriate for general photography whereby blade mechanism 12 is operated in a manner that is balanced or optimized for the best compromise between depth of field and motion stopping ability. The selection of either the depth of field or stop motion modes overrides the provision of the general photography program and substitutes therefor appropriate trajectory data programs which emphasize the selected characteristics, i.e., effective aperture or exposure interval.

Figure 2:
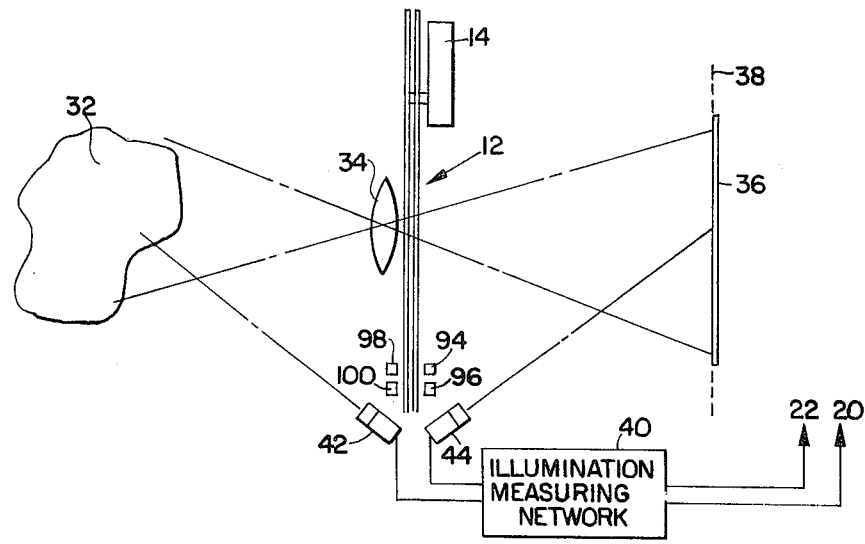
FIG. 2 is a diagrammatic top view of selected components of a photographic apparatus incorporating the exposure control system embodying the present invention.

As shown diagrammatically in FIG. 2, the exposure control system 10 is intended for use in photographic apparatus, such as a camera or the like, for controlling the transmission of image forming light rays of a scene 32, provided by objective lens 34 to a film unit 36 located at the camera's film plane 38. System 10 also includes an illumination measuring network 40 which utilizes a first photocell 42 mounted on the camera to receive light from a selected portion of the field of view of lens 34 in providing the pre-exposure scene brightness level input 20 and a second photocell 44 mounted on the interior of the camera to receive light from the image formed at the film plane on film unit 36 for providing input 22 to microcomputer 18. Alternatively, a measure of scene brightness may be obtained by using a photocell looking at the scene though appropriate aperture shapes associated with the blade mechanis. In this case, photocell 44 is eliminated and photocell 42 is located in operative relation with secondary photocell apertures in the scanning blade mechanism 12 to provide both the pre-exposure input 20 and input 22.

It will be understood that within the context of this disclosure the term "brightness" or "brightness level" is intended to mean the illumination level of the scene or image at the film plane as it is commonly measured in the photographic art for determining proper film exposure.

Returning to FIG. 1, blade mechanism 12 is of the integrated type that performs both the effective aperture and exposure interval defining functions. In the illustrated embodiment, blade mechanism 12 comprises a pair of thin, elongated blade members 46 and 48 mounted by means (not shown) in superposed relation for simultaneous reciprocal displacement in opposite directions, in response to rotation of stepper motor 14, between positions blocking and unblocking the transmission of image forming light to the film plane 38.

The forward blade member 46 includes a generally rectangular major section 50 having a longitudinally tapered opening 52 therein; and an integrally formed elongated drive arm 54 extending laterally (to the left) from the lower left-hand end of major section 50 and including on the upper horizontal edge thereof an integrally formed toothed rack 56 that is in mesh with the underside of a drive pinion 58 fixedly secured to the drive shaft 60 of stepper motor 14.

The rear blade 48 includes a major section 62 having a complementary tapered opening 64 therein; and an integrally formed upper drive arm 66 having a toothed rack 68 on its lower horizontal edge in mesh with the top side of drive pinion 58.

In response to a counterclockwise rotation of motor 14 gear 58 will drive forward blade member 46 to the right and simultaneously drive rear blade member 48 to the left so that openings 52 and 64 will be completely out of registration with their narrow tapered ends in facing relation to define the closed or light-blocking position of blade mechanism 12. In response to clockwise rotation of motor 14, the blades are driven in the opposite directions so that openings 52 and 64 progressively overlap and cooperate to define an exposure aperture 70 that is centered on the optical axis of objective lens 34. As blade members 46 and 48 move away from the closed position, exposure aperture 70 becomes progressively larger until it defines a maximum obtainable aperture wherein the major portions of openings 52 and 64 are in full registration. As the blade members 46 and 48 are driven back toward the closed position, exposure aperture 70 progressively decreases in size until it closes.

The change in size of the exposure aperture 70 with each incremental step of the blade mechanism 12 will, of course, depend on the selected shape for the openings 52 and 64. It should be understood that it is within the scope of the present invention to use openings 52 and 64 that provide either linear or nonlinear rates of changes in exposure aperture size as a function of blade displacement and that the particular shape of the openings 52 and 64 shown in FIG. 1 are by way of illustration only.

Figure 3:
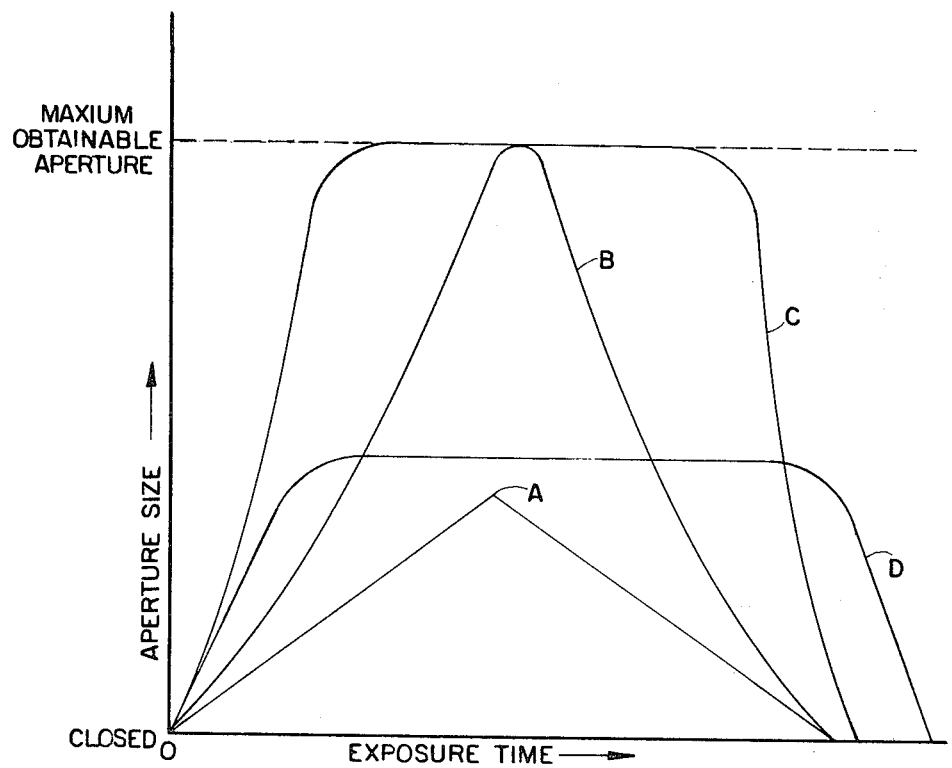
FIG. 3 shows a variety of different shaped aperture size versus exposure time trajectory curves.

With reference to FIG. 3, the operation of blade mechanism 12 and the nature of the resultant exposure may be characterized by an aperture size or area (Y-axis) versus exposure time or interval (X-axis) trajectory curve. The area under the trajectory curve is indicative of the total quantity of ambient image light that impinges upon the film unit. The shape of the curve, however, defines the average or effective aperture and exposure interval and is therefore indicative of depth of field and motion stopping ability.

In terms of photographic performance, the versatility of a scanning shutter mechanism can be rated on its ability, or lack thereof, to generate a variety of different trajectory curves utilizing the largest possible portion of the plotting area. There are, of course, some practical limitations to full utilization of the plotting area in that mechanical shutters and their drive systems inherently have mass and inertial characteristics that preclude instantaneous blade movement from a closed position to a predetermined aperture. But, in general, a blade mechanism that can be driven in a controlled manner at a relatively fast maximum rate will be more versatile than a shutter that has a lower rate limit.

Let's assume that the apertures 52 and 64 in blade mechanism 12 are designed so that exposure aperture 70 increases in size linearly as a function of blade displacement.

If the drive system for stepper motor 14 can operate only at a fixed rate, as is common in many stepper motor shutters known in the prior art, then the variety of trajectory curves that can be generated is severely limited. For example, trajectory curve A is triangular in shape and indicates that the aperture increases at a fixed rate to a peak aperture and then decreases at the same rate until the shutter closes. Because the rate of blade displacement is fixed, the slope of the opening and closing portions of the trajectory cannot be changed. If exposure interval is increased, the size of the peak aperture increases accordingly. The trajectory shape can be changed somewhat, however, by stopping blade displacement at a given peak aperture for a given time before closing so that the trajectory has a truncated shape. Versatility is still quite low because the trajectories are constrained to a family of curves that have fixed slopes in their opening and closing sections.

The performance versatility of blade mechanism 12 can be increased substantially by providing a drive system wherein the rate at which stepper motor 14 is driven can be changed. For example, to photograph a very bright scene, it may be desirable to open the blades slowly (shallow slope) to a relatively small peak aperture and then close the blades at the same rate. The high brightness level will keep the exposure interval short (good motion stopping ability) while the relatively small effective aperture will insure good depth of field.

If one wishes to photograph a scene that is less bright but yet maintain the same exposure interval, the blade mechanism 12 should be driven at a faster rate so that it reaches a larger effective aperture during the course of the exposure interval. Under the same scene lighting conditions, a variable drive rate shutter will also allow a choice of trajectory curve shapes to emphasize different exposure parameters. Obviously, then, a shutter in which the rate of blade displacement can be changed for different exposures has increased versatility.

By the same token, if the rate of blade displacement can also be changed during the exposure interval to provide blade acceleration or deceleration, then the trajectory curves are no longer limited to having linear opening and closing portions and versatility is once again increased. For example, curve B shows a generally triangular trajectory that has sagging or approximately parabolic sides and under current thinking tends to be the best balanced compromise between depth of field and motor stopping. In this exposure, the blade mechanism opens to the maximum aperture and then closes in the same manner so that the closing section of the trajectory is a mirror image to the opening section. Trajectory C is indicative of an exposure where the blades open at a much faster rate to the maximum aperture where it is maintained for a period of time before it closes. Trajectory D indicates that the blades open at some intermediate rate to a peak aperture, well below maximum aperture where it is held for a period of time before it is closed. Thus, if the motor drive system can operate at different rates, and provide blade acceleration and deceleration during exposure, then the scanning shutter system will be highly versatile in that a greater number of different shaped trajectories may be generated to best accommodate a variety of photographic situations.

A stepper motor drive system was chosen for exposure control system 10 because it can be accelerated and decelerated in a controlled manner during the course of a typical exposure interval to generate a large number of different trajectory curve shapes and it is also compact and relatively inexpensive considering its intended function.

A stepper motor suitable for use in exposure control system 10 typically has a permanent magnet rotor with four coil unipolar or bifilar windings. In the illustrated embodiment, the blades 46 and 48 are typically displaced one-half inch between the closed and maximum aperture defining positions. A 24-step/revolution motor (15°/step) may be operated in a half-step mode (48-steps/revolution) and drive the blades 46 and 48 between the closed and maximum aperture defining position with 180° rotation, i.e., 24 steps (7.5°/step). For best acceleration characteristics, the holding torque-to-inertia (rotor plus load) ratio should be as large as possible. Those having skill in the stepper motor art will appreciate that motor 14 may be operated in the half step mode simply by changing the pattern of coiled energization so that on an alternating basis, either one or two coils at a time are energized to effect stepping.

The stepper motor drive circuit 16 is responsive to pulse inputs (direction of rotation at terminal D and stepping sequence at terminal S) for effecting the correct sequence of coil energizations to control the rate and direction of motor drive. Such drive circuits are well known in the art and need not be described further here to understand the present invention.

Trajectory input from microcomputer 18 to the stepper motor drive circuit 16 comprises a program of trajectory signals for controlling the rate and direction of rotation of motor 14 so that blade mechanism 12 is operated in a manner characterized by a corresponding trajectory curve. The trajectory program includes appropriate clockwise or counterclockwise rotation signals fed to terminal D of circuit 16 and a series of motor stepping pulse signals fed to terminal S which control the angular relation between the rotor and stator magnetic fields to effect operation of stepper motor 14.

The microcomputer 18 comprises an input device or buffer 72 for feeding the previously-noted inputs in appropriately encoded form to a microprocessor or central processing unit 74. Microprocessor 74 interacts with a read only memory (ROM) 76 which stores both the control program defining the computer's operating instructions and a preprogrammed set of trajectory data which microprocessor 74 will manipulate to develop a plurality of different programs of trajectory signals in response to the differing inputs. The developed trajectory signal program or output from microprocessor 74 is fed through an output device or buffer 78 as the trajectory input to the stepper motor drive circuit 16.

In FIG. 1, the major components of microcomputer 18 are shown separately merely to identify their functions. In its actual construction, microcomputer 18 may be formed on a single substrate (computer on a chip) or may comprise a plurality of appropriately interconnected separate large scale integrated circuits.

The use of microcomputer 18 to define and control the operation of blade mechanism 12 in response to one or more of the inputs provides a great deal of flexibility in how exposure control system may be used because defining the operation of blade mechanism 12 now simply becomes a matter of programming microcomputer 18. That is, if system 10 is to be used in a fairly simple camera that uses only one particular type of film, employs a fixed focus lens, and is responsive to only a limited number of inputs, it is only necessary to program microcomputer 18 to develop the relatively small number of different trajectory signal programs to fully utilize the photographic capabilities of such a camera. In more complex camera models which may use several different types of film having varying film speeds and/or exposure characteristics and are configured to provide the operator with a variety of exposure options, microprocessor 18 can be suitably programmed in a more detailed manner to be responsive to additional inputs including those relating to film characteristics for providing a greater number of different trajectory signal programs. More importantly perhaps, exposure control system 10 can be periodically updated at the factory by reprogramming microcomputer 18 to take advantage of new ideas in exposure control.

As an example of how system 10 functions, let's assume it is configured as shown in FIGS. 1 and 2 with the mode selection switch 24 in the balanced position to provide input 26. In response to the operator actuating cycle start button 19, illumination measuring circuit 40 and its associated photocell 42 are energized to provide the preexposure scene brightness level input 20.

Figure 4:
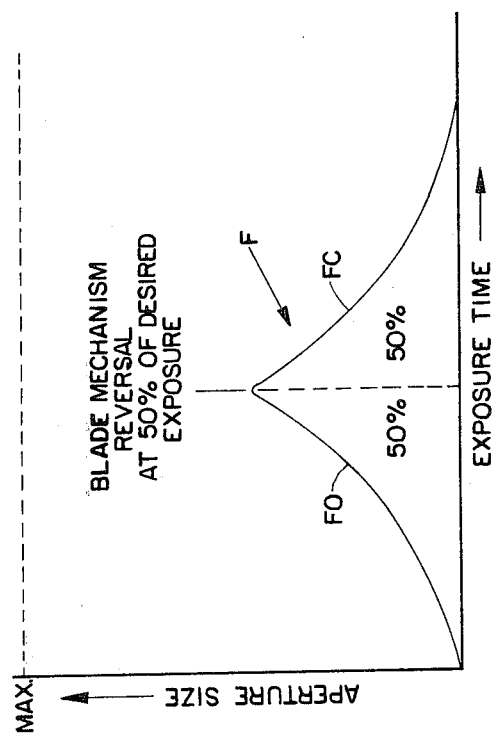
FIG. 4 is a graph showing a single trajectory curve.

Based on the scene brightness level input 20, the characteristics of the film used, and the properties of the camera's optical system, it has been determined that proper exposure, balanced for depth of field and motion stopping ability will be obtained if blade mechanism 12 is operated in a manner characterized by the trajectory curve F shown in FIG. 4.

The opening portion, FO, is approximately parabolic, showing that the rate of change of aperture area starts out slowly and then progressively accelerates until a peak aperture, less than the maximum obtainable aperture is defined at which point the direction of stepper motor drive is reversed to define the closing section, FC, which is essentially a mirror image of the opening section, FO. The symmetrical nature of curve F indicates that 50% of the total exposure light impinges upon the film unit 36 during the opening phase and the other 50% during the closing phase. That is, the blade drive system is reversed at 50% of the total desired exposure.

Broadly speaking, the trajectory data section of ROM 76 includes data serving at least as characterizing elements of a plurality of differently shaped trajectory curves. Typically there will be data for a family of balanced trajectory curves which will vary in the shape of their opening and closing sections for different scene brighness levels. For relatively high scene brightness levels, the opening and closing slopes will be relatively shallow so that the peak and average or effective aperture will be relatively small thereby providing good depth of field. For a lower scene illumination levels, the opening and closing slopes will be steeper indicating that the blades will open more rapidly to a higher peak and effective aperture for the same exposure interval. Also, there will be additional data defining separate families of trajectories that are shaped to emphasize depth of field or motion stopping ability.

In response to the various inputs, in this case balance mode input 26 and scene brightness level input 20, the microprocessor 74, operating under the control of the instructional program in ROM 26, will select appropriate data from the balanced family of trajectories and develop therefrom a program of trajectory signals that when applied as the input trajectory program to drive circuit 16 will cause stepper motor 14 to drive blade 12 in a manner characterized by trajector curve F.

There are, of course, many ways to program microcomputer 18. For example, the trajectory data section of ROM 76 could be programmed with enough data to define the entire curve F based on the preexposure input 20 alone. However, in a preferred embodiment it is programmed only to include data defining the shape of the opening portion of each of the plurality of trajectories for reasons of programming economy and added flexibility.

In this case, microcomputer 18 initially provides the appropriate program of trajectory signals to drive blade mechanism 12 from its closed position toward its fully open position along trajectory portion FO. At this point, the illumination measuring circuit 40 and photocell 44 operate in a light integrating mode to monitor the image illumination level at the film plane and provide input 22. When the image illumination level reaches 50% of the total indicated as required by the preexposure input 20 and the film speed, the microprocessor 74 changes the program of trajectory signals to reverse the blade drive. The mirror image closing portion FC of the trajectory curve F is generated by reversing the opening trajectory signal program utilized up to the turnaround point. That is, a record of the opening section of trajectory signals is maintained in storage and then is utilized to define the mirror image closing portion of the trajectory.

In addition to generating the generally triangular trajectories, the data defining the opening sections of the different trajectory curves may be utilized to generate other shaped curves such as C and D shown in FIG. 3 wherein the blades are driven to a predetermined peak aperture and then are held there for some time before the blade drive is reversed to define the closing sections of the curve.

If the operator wishes to emphasize depth of field or motion stopping ability, he merely changes the setting of selector switch 24 to provide either input 28 or 30. These inputs override selection from the balanced family of trajectory data and switch selections to the appropriate alternative programs. In the depth of field mode, the trajectory curves resulting from the developed trajectory signal programs generally will have different effective apertures and exposure intervals in comparison to the balance trajectories provided for the same exposure conditions. Also, the motion stopping mode trajectories will have different exposure intervals and effective apertures.

By appropriately programming microcomputer 18 to vary the rate of blade mechanism displacement, including acceleration or deceleration during the course of an exposure interval, a wide variety of characterizing trajectory curves may be generated. These may have linear or non-linear portions, or combinations of both. Also, they may be symmetrical or asymmetrical.

The dynamic response of exposure control system 10 is a major determining factor as to whether or not it can accurately generate a particular trajectory curve characterizing the operation of blade mechanism 12.

While the performance characteristics of microcomputer 18, stepper motor drive circuit 16 and illumination measuring network 40 impose certain constraints in dynamic response, the most significant limitation is the response capability of the stepper motor 14 operating under the loading of blade mechanism 12 to accurately follow the stepping sequence defined by the trajectory signal program. That is, if the trajectory signal program includes sequences of pulses which the stepper motor 14 cannot follow, then the actual trajectory characterizing the operation of the blade mechanism 12 will be at variance with the planned trajectory.

The exposure control system 10 described above is configured for open loop operation and is well-suited, in terms of performance level and cost effectiveness, for use in a wide variety of cameras.

Figure 5:
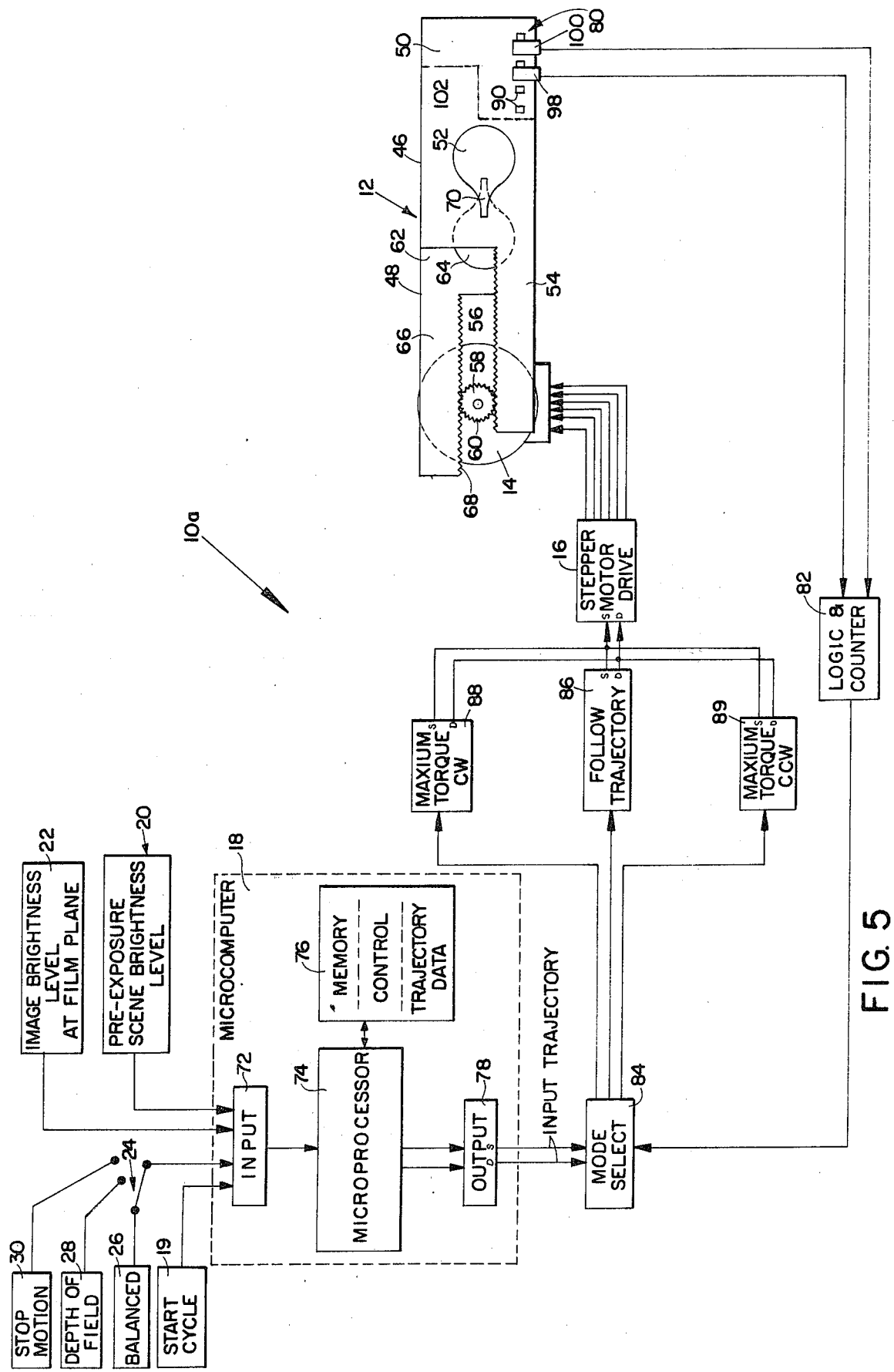
FIG. 5 is a block diagram showing a second embodiment of an exposure control system embodying the present invention wherein it is configured for closed loop operation.

Alternatively, for use in more sophisticated cameras justifying additional costs by providing more exposure options which may typically require a greater variety of trajectories and/or trajectories having more complex shapes, the performance level of the exposure control system embodying the present invention may be extended by adding a position feedback control loop. Such a closed loop exposure control system 10a is shown in FIG. 5 wherein components that serve the same functions in the previously-described system 10 carry the same numerical designation.

System 10a additionally includes a blade displacement encoder system 80 for monitoring the stepwise position of blade member 46 during the course of an exposure interval; a logic and counter network 82 for receiving pulse signals from encoder system 80 and providing a displacement output signal indicative of the stepwise position of blade member 46; and a mode select network 84 for receiving and comparing the input trajectory signal with the displacement signal and providing to stepper motor drive circuit 16 either a follow trajectory input 86 comprising the original input trajectory signal from microcomputer 18 when the blade member 46 is in the correct position for the planned trajectory or, when there is a large enough variance between the displacement output and the trajectory input, a corrective signal program which switches the stepper motor to a maximum torque mode of operation via the provision of either a maximum torque-clockwise or maximum torque-counterclockwise inputs, designated 88 and 89 respectively. It will be noted that the inputs fed to any device, network, subsystem, etc. are outputs from preceding devices, networks, etc. and the terms "input" and "output" may be used interchangeably herein where appropriate.

In the illustrated embodiment, encoder system 80 is an optical two quadrature track encoder that senses the position of blade member 46 throughout the exposure. Because blade members 46 and 48 are coupled together for simultaneous movement by pinion 58 only one blade member has to be monitored to know the disposition of blade mechanism 12. Encoder system 80 includes a longitudinally extending array of vertical slits 90 shown disposed along the lower right-hand edge portion of the major section 50 of blade member 46, a pair of light emitting diodes (LEDs) 94 and 96 (see FIG. 2) positioned behind slits 90 and a corresponding pair of aligned photosensitive detectors or photocells 98 and 100 located on the forward side of blade member 46 in front of the slits 90. In response to movement of blade member 46, the slits 90 and the intervening opaque segments therebetween sequentially unblock and block transmission of light from the LEDs to the corresponding photocell detectors 98 and 100 to produce a digitally encoded output therefrom in a well-known manner. In this embodiment, the lower right-hand portion of major section 62 of the rear blade member 48 is cut away, as indicated at 102, to provide clearance for the LEDs 94 and 96.

The slits 90, and the equal width opaque blocking segments therebetween, are spaced on center at intervals corresponding to a full step (7.5° of rotation of motor 14) while the detectors 98 and 100, and their corresponding LEDs 94 and 96, are spaced in half interval relation (3.75°). With this arrangement, there are three output conditions: both detectors 98 and 100 blocked by the intervening sections between slits 90 from receiving light from the LEDs 94 and 96 providing a 0—0 output; both detectors unblocked providing a 1—1 output; or one detector blocked and the other detector unblocked providing either a 1-0 or 0-1 output, depending on which detector is blocked.

The outputs from detectors 98 and 100 are fed to network 82 which includes a logic circuit for decoding the directional information and a counter for counting each half step of blade displacement. Typically, the count is set at 0 when the blade mechanism is in the closed position the count increases as the blade mechanism opens and decreases in response to a directional change signal when the blade mechanism reverses direction.

The mode select network 84 is a logic subsystem which compares the blade displacement output or count from network 82 with the directional and stepping pulse input trajectory signals (D and S) provided by microcomputer 18. If there is correlation, indicating that the blade member 46 is in the correct position to follow the planned trajectory, then network 84 operates in its normal follow trajectory mode (input 86) and continues to supply the original trajectory signal program supplied by microcomputer 18 to the stepper motor drive circuit 16. However, if the signal comparison indicates that blade member 46 is either ahead of or is lagging behind the correct position too much, network 84 automatically switches to a maximum torque mode of operation and provides a corrective signal program to operate the stepper motor drive circuit 16 in a maximum torque mode. The corrective signal program comprises the provision of the appropriate maximum torque directional and stepping pulse inputs 88 or 89 to accelerate or decelerate motor 14 and thereby move the blade mechanism 12 toward the correct position. Such corrective action will continue until the feedback count from network 82 indicates that the blade mechanism 12 is at its correct position to generate the planned trajectory at which point network 84 automatically switches back to the follow trajectory mode resuming the provision of input 86.

Figure 6:
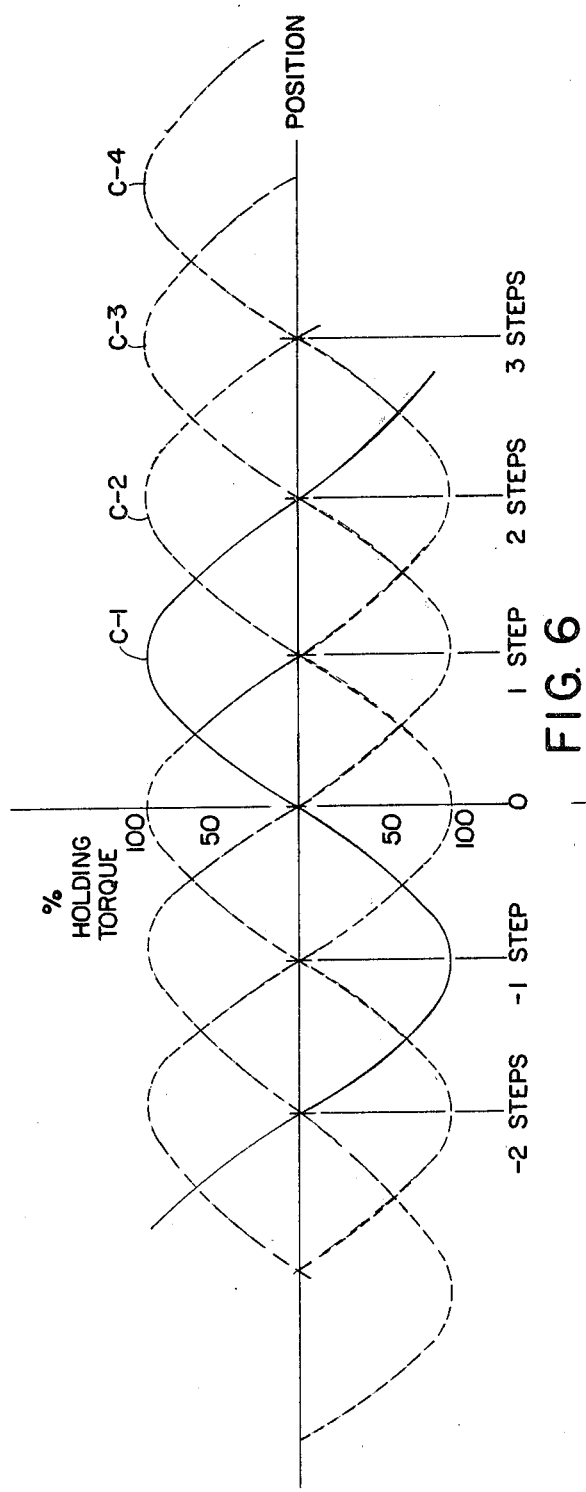
FIG. 6 shows a set of torque curves for a stepper motor used in the exposure control system.

The torque developed by a stepper motor varies as a function of angular displacement (lead or lag) between the rotor and stator fields. Typical torque producing characteristics of a four coil unipolar stepper motor 14 used in systems 10 and 10a are illustrated in FIG. 6 by sinusoidal torque curves showing percent holding torque (Y-axis) as a function of rotor angular displacement for each of the four coils C-1, C-2, C-3 and C-4, which are electrically displaced 7.5° from each other for polyphase operation. Portions of the torque curves above the X-axis indicate counterclockwise torque—below, clockwise torque.

If only coil C-1 is energized producing the torque curve shown in solid lines, and the rotor is at the 0 step position, there will be no net torque produced on the rotor and it will be stabilized at the 0 step position. However, if the rotor is then manually rotated away from the 0 step position, the torque produced thereon by the field of the energized coil C-1 increases with progressive rotor displacement until it reaches the maximum value when displacement is equal to one step position. The direction of the torque, of course, will depend on the direction of rotor displacement away from the 0 step position.

Let's assume that the rotor is stabilized at the 0 step position with coil C-1 energized. Upon receipt of the next stepping pulse for a counterclockwise rotation, coil C-1 is de-energized and coil C-2 is energized. Because the rotor now lags the field produced by coil C-2, it now exerts a maximum counterclockwise torque on the rotor to drive it toward the 1 step position. As the rotor approaches the 1 step position, the counterclockwise torque on the rotor declines until the rotor reaches the 1 step position whereupon the field of coil C-2 exerts no net torque thereon. To move the rotor in the opposite direction from the 0 step position to the −1 step position, coil C-4 would be energized instead of coil C-2 to produce a maximum clockwise torque on the rotor to drive it towards the −1 step position.

To drive stepper motor 14 continuously in a counterclockwise direction, the coils are energized and de-energized sequentially—C-1, C-2, C-3, C-4, C-1— etc. For clockwise rotation the order of coil activation is reversed.

The average torque developed by stepper motor 14 may be increased or decreased within limits by varying the timing of the coil switching sequence to adjust the lead or lag angle of the rotor field with respect to the stator field.

Figure 7:
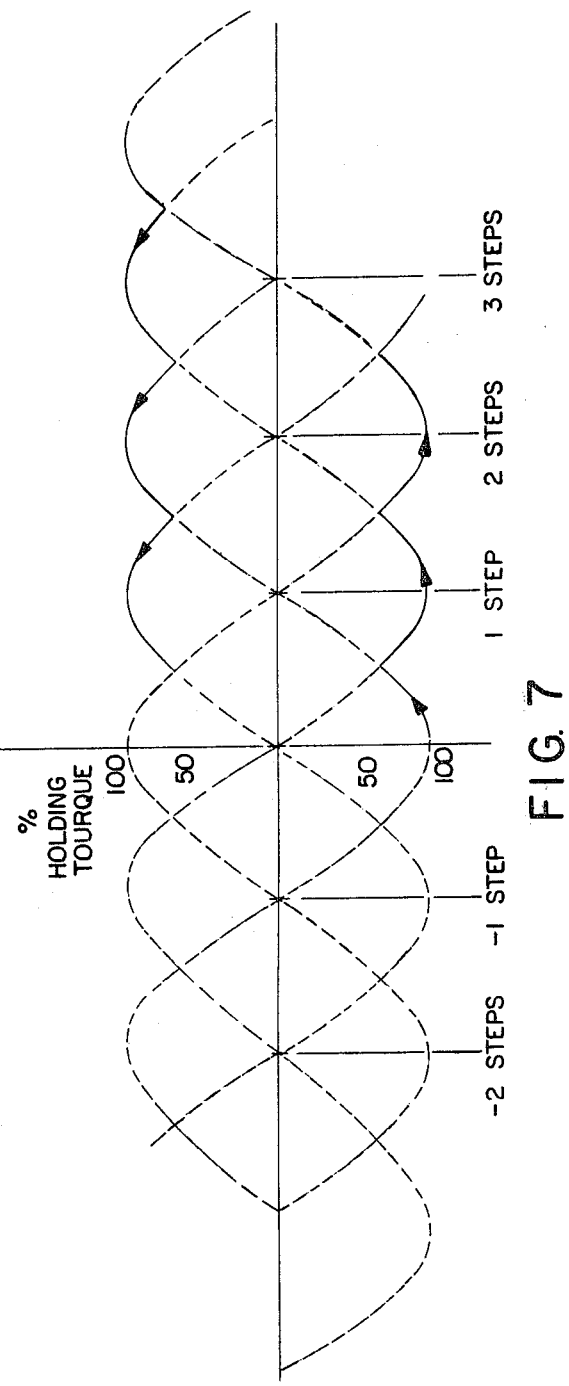
FIG. 7 is similar in some respects to FIG. 6 but shows the coil switching points on the torque curves to operate the stepper motor in a maximum torque mode.

For example, to produce maximum average torque, coil switching takes place at or near the cross-over points of adjacent torque curves where the torque produced by the next adjacent energized coil is increasing toward its maximum value. The energized states of adjacent coils for maximum torque mode operation at slow speeds are shown in solid lines with arrow in FIG. 7 indicating that the coil switching sequence is set to ride the crests of the torque curve waves.

When stepper motor 14 is operated in the half step mode successive stepping command signals energize two coils then one coil on an alternating basis. Upon shifting to maximum torque mode operation, the coil switching pattern is modified so that two coils are energized (providing additive torque).

During follow trajectory mode operation, stepper motor 14 is operated, for the most part, at average torque levels that are well below the maximum to generate the desired trajectories. However, if some portion of the desired trajectory curve requires rapid motor acceleration or deceleration, some maximum torque mode operation will be included in the program of trajectory signals supplied by microcomputer 18.

In general, maximum torque mode operation is held in reserve as a corrective measure, to be employed when the feedback loop indicates that the blade mechanism 12 is not in the correct position to follow the planned trajectory accurately enough, for providing maximum acceleration or deceleration of motor 14 to move the blade mechanism 12 toward its correct position as rapidly as possible.

The addition of the feedback loop allows control of system 10a to be maintained with a greater variance in operating parameters than in the open loop system thereby extending its performance level beyond the previously-noted limits of system 10.

In operation, exposure control system 10a is actuated in response to the operator pressing signal start button 19. As in system 10, the pre-exposure scene brightness level input 20 is provided by illumination measuring circuit 40 to microcomputer 18 which in turn provides a selected program of trajectory signals comprising the direction of motor rotation input D along with a sequence of stepping pulses input S to define the opening portion of the selected trajectory to mode select network 84. Network 84 operating in the follow trajectory mode applies this input 86 to stepper motor drive circuit 16 to drive blade mechanism 12 away from its closed position. In response to such opening movement, encoder system 80 monitors the actual displacement of blade member 46 with the output being fed back through logic and counter network 82 to the mode select network 84. If blade member 46 is in the correct position to follow the planned trajectory accurately enough, mode select network 84 continues to operate in the follow trajectory mode. However, if the displacement output or count in network 82 indicates that the blade member 46 is not in the correct position, then network 84 will switch to the maximum torque mode of operation and supply the appropriate input 88 or 89 to stepper motor drive circuit 16 to accelerate or decelerate motor 14 in a manner to move the blade mechanism toward its correct position. For example, motor 14 rotates in a clockwise direction to drive the blade mechanism 12 from its closed position toward its maximum aperture defining position. If the indication is that blade mechanism 12 is lagging too far behind its intended position, mode select network 84 will automatically switch to provide the maximum torque clockwise input 88 thereby accelerating blade mechanism 12 ahead toward its correct position. If, on the other hand, blade mechanism 12 is leading its correct position too much, mode select network will shift to the maximum torque mode and provide the maximum torque counterclockwise input 89 to provide a reverse torque which decelerates motor 14 and slows down advancement of blade mechanism 12 to move it back towards its correct position. The maximum torque mode correction continues until the encoder generated displacement output indicates to mode select network 84 that maximum torque mode correction is no longer required at which point mode select network 84 automatically switches back to the follow trajectory mode of operation.

The blade mechanism 12 continues to open until the illumination measuring circuit 40 provides input 22, indicating that 50% of the acquired illumination for proper exposure has impinged upon the film unit at film plane 38, at which point microcomputer 18 provides the trajectory signal program defining the mirror image closing portion of the selected trajectory. As the blade mechanis 12 is closed, encoder system 80 continues to monitor the position of blade member 46 so that mode select network 84 may shift to the maximum torque mode if it is necessary to provide a corrective signal program during the course of the closing portion of the trajectory.

System 10a includes the same optional inputs 26, 28 and 30 as the previously-described open loop system 10 and they operate in the same manner as before. Those skilled in the art will appreciate that there may be many modifications to systems 10 and 10a, such as including additional inputs providing information about film speed and/or exposure characteristics without departing from the scope of the invention.

Because certain additional changes may be made in exposure control systems 10 and 10a without departing from the scope of the present invention, it is intended that all matter contained in the above description or shown in the accompanying drawings shall be interpreted as illustrative and not in a limiting sense.

What is claimed is:

1. An exposure control system usable in photographic apparatus for controlling transmission of image-forming light rays from a scene to a film unit in a film plane, said system comprising:

a blade mechanism;

means for mounting said blade mechanism for displacement between a first arrangement wherein it blocks transmission of scene light to the film plane and a second arrangement wherein it defines a maximum aperture, said blade mechanism serving to define a range of progressively increasing sized apertures as it moves from its said first arrangement towards its said second arrangement and then a range of progressively decreasing sized apertures as it returns to its said first arrangement for unblocking transmission of scene light to the film plane during an exposure interval;

means including a stepper motor responsive to a program of trajectory signals for driving said blade mechanism in a manner whereby its operation is characterized by an aperture size versus time trajectory curve defined by said program of trajectory signals;

means for storing at least characterizing elements of a plurality of different trajectory signal programs defining corresponding trajectory curves that are appropriate for differing photographic conditions, including at least one trajectory signal program that causes the rate of blade mechanism drive to vary during the course of an exposure interval so that the corresponding trajectory curve has at least one non-linear portion; and electrical circuit means responsive to one or more electrical input signals indicative of pre-exposure photographic conditions or of photographic conditions ascertained during the course of an exposure interval for selecting appropriate characterizing elements from said storage means and therefrom developing and feeding a correlated program of trajectory signals to said blade mechanism driving means.

2. An exposure control system usable in photographic apparatus for controlling transmission of image-forming light rays from a scene to a film unit in a film plane, said system comprising:

a blade mechanism;

means for mounting said blade mechanism for displacement between a first arrangement wherein it blocks transmission of scene light to the film plane and a second arrangement wherein it defines a maximum aperture, said blade mechanism serving to define a range of progressively increasing sized apertures as it moves from its said first arrangement towards its said second arrangement and then a range of progressively decreasing sized apertures as it returns to its said first arrangement for unblocking transmission of scene light to the film plane during an exposure interval;

means including a stepper motor responsive to a program of trajectory signals for driving said blade mechanism in a manner whereby its operation is characterized by an aperture size versus time trajectory curve defined by said program of trajectory signals;

means for storing at least characterizing elements of a plurality of different trajectory signal programs defining corresponding trajectory curves that are appropriate for differing photographic conditions;

electrical circuit means responsive to one or more electrical input signals indicative of pre-exposure photographic conditions or of photographic conditions ascertained during the course of an exposure interval for selecting appropriate characterizing elements from said storage means and therefrom developing and feeding a correlated program of trajectory signals to said blade mechanism driving means; and manually operable means for providing, at the election of the operator, either a first pre-exposure input signal which will direct said electrical circuit means to provide a program of trajectory signals resulting in an exposure interval emphasizing trajectory curve to control motion stopping ability or a second pre-exposure input signal which will result in an effective aperture size emphasizing trajectory curve to control depth of field.

3. An exposure control system usable in photographic apparatus for controlling transmission of image forming light rays from a scene to a film unit in a film plane, said system comprising:

a blade mechanism;

means for mounting said blade mechanism for displacement between a first arrangement wherein it blocks transmission of scene light to the film plane and a second arrangement wherein it defines a maximum aperture, said blade mechanism serving to define a range of progressively increasing sized apertures as it moves from its first said arrangement toward its second said arrangement and then a range of progressively decreasing size apertures as it returns to its said first arrangement to unblock transmission of scene light to the film plane during an exposure interval;

electrical circuit means responsive to one or more input signals indicative of pre-exposure photographic conditions or of photographic conditions ascertained during the course of an exposure interval for developing an electrical output correlated thereto from a plurality of differing potential outputs;

means responsive to said developed electrical output for driving said blade mechanism in a manner characterized by an aperture size versus time trajectory curve defined by said developed electrical output and differing from trajectory curves provided by said blade mechanism driving means in response to other of said plurality of potential outputs;

feedback means for monitoring actual blade mechanism displacement during the course of an exposure interval and providing an electrical displacement output representative of such actual displacement; and means for comparing said displacement output with said developed output and, when there is a difference therebetween, for providing a corrective output to said drive means to adjust the rate of blade mechanism drive so that the trajectory curve characterizing actual blade mechanism displacement substantially conforms to the trajectory curve defined by said developed output.

4. The system of claim 3 wherein said drive means includes a stepper motor.

5. The system of claim 3 wherein said corrective output causes said stepper motor to be operated in a maximum torque mode.

* * * * *